(12) United States Patent
Brenneis et al.

(10) Patent No.: US 9,046,610 B2
(45) Date of Patent: Jun. 2, 2015

(54) DEVICE FOR MONITORING NUCLEAR MATERIAL PLACED IN A GLOVE BOX

(75) Inventors: Christophe Brenneis, Saint Victor la Coste (FR); Christian Ducros, Pont-Saint-Esprit (FR); Fabrice Lamadie, Connaux (FR); Philippe Girones, Venejan (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 229 days.

(21) Appl. No.: 13/704,595

(22) PCT Filed: Jun. 20, 2011

(86) PCT No.: PCT/EP2011/060238
§ 371 (c)(1),
(2), (4) Date: Dec. 14, 2012

(87) PCT Pub. No.: WO2011/161057
PCT Pub. Date: Dec. 29, 2011

(65) Prior Publication Data
US 2013/0087714 A1    Apr. 11, 2013

(30) Foreign Application Priority Data
Jun. 21, 2010  (FR) ..................................... 10 54914

(51) Int. Cl.
*G01T 7/00* (2006.01)
*G21F 7/04* (2006.01)

(52) U.S. Cl.
CPC .... *G01T 7/00* (2013.01); *G21F 7/04* (2013.01)

(58) Field of Classification Search
CPC ..................................... G01T 7/00; G21F 7/04

USPC ................. 250/370.01, 370.09, 336.1, 363.1; 378/147
See application file for complete search history.

(56) References Cited

U.S. PATENT DOCUMENTS

| | | | | |
|---|---|---|---|---|
| 5,036,201 A | * | 7/1991 | Carroll et al. | 250/363.1 |
| 6,218,669 B1 | * | 4/2001 | Call | 250/370.11 |
| 6,806,475 B1 | * | 10/2004 | Lightfoot et al. | 250/395 |
| 2007/0018110 A1 | * | 1/2007 | McGregor et al. | 250/391 |
| 2011/0017914 A1 | * | 1/2011 | Flamanc et al. | 250/362 |

FOREIGN PATENT DOCUMENTS

| | | |
|---|---|---|
| EP | 1 218 774 | 6/2003 |
| WO | 01/23910 | 4/2001 |

OTHER PUBLICATIONS

International Search Report and Written Opinion for International Application No. PCT/EP2011/060238, mailed Sep. 26, 2011.
"Fundamental Safe Rules Relating to Basic Nuclear Installations Other Than Nuclear Reactors", Rule No. I.3.c, Oct. 18, 1984.

* cited by examiner

*Primary Examiner* — David Porta
*Assistant Examiner* — Mindy Vu
(74) *Attorney, Agent, or Firm* — Nixon Peabody LLP

(57) ABSTRACT

A mechanical device for supporting and attaching at least one ionizing radiation detection probe. For each detection probe it includes one probe-holder ending in a collimator-holder able to support a collimator intended to delimit a field of observation of the detection probe, and an attachment device intended to be attached to a glove port of a glove box, where the probe-holder, or each probe-holder, cooperates with the said attachment device.

11 Claims, 5 Drawing Sheets

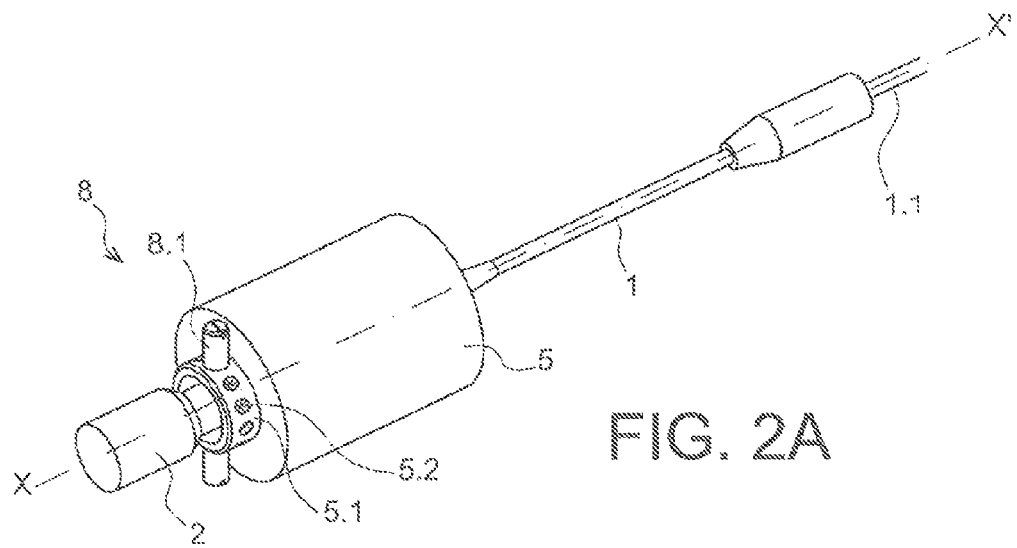
FIG. 2A
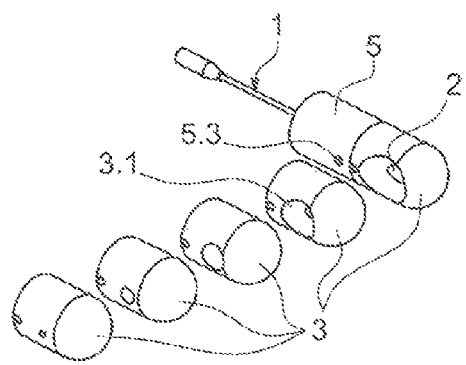
FIG. 2B
FIG. 2C
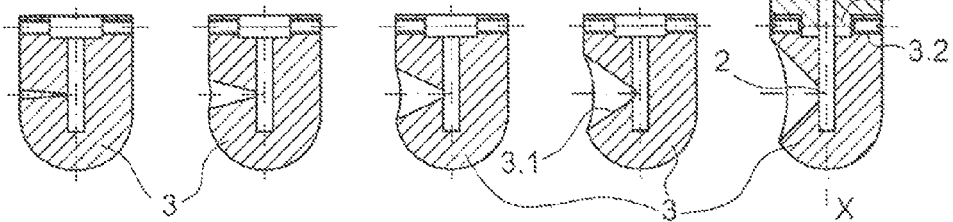

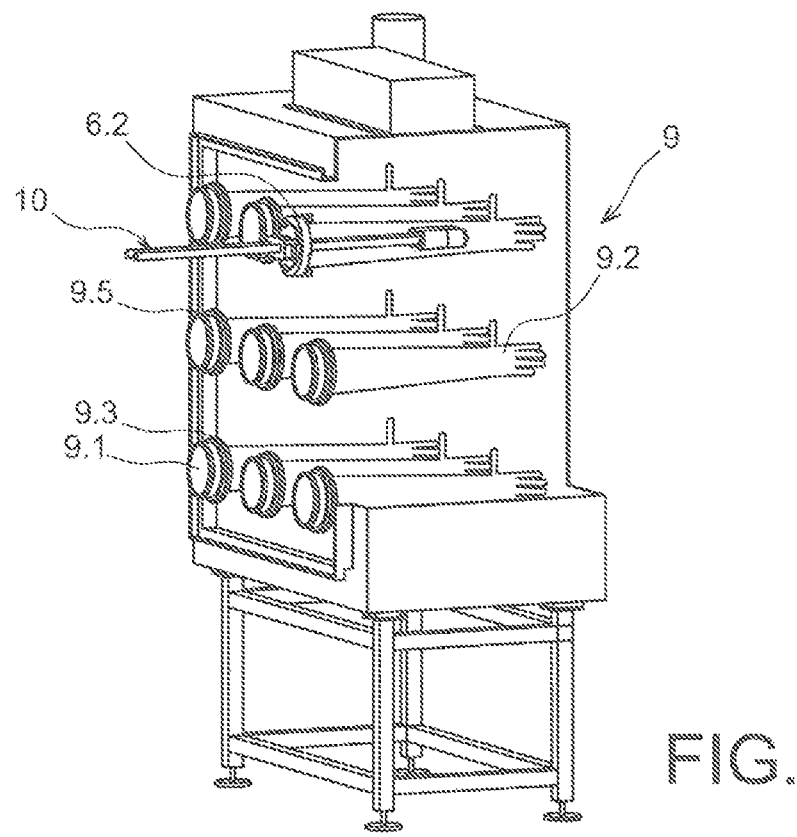
FIG. 3
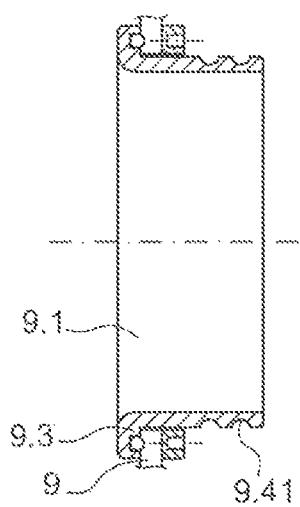
FIG. 4A1
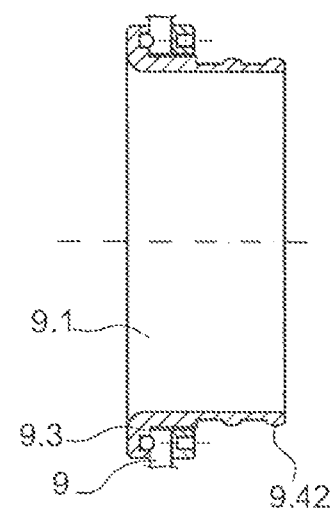
FIG. 4A2

DEVICE FOR MONITORING NUCLEAR MATERIAL PLACED IN A GLOVE BOX

CROSS REFERENCE TO RELATED APPLICATIONS or PRIORITY CLAIM

This application is a National Phase of PCT/EP2011/060238, filed Jun. 20, 2011, entitled, "DEVICE FOR MONITORING A NUCLEAR MATERIAL PLACED IN A GLOVE BOX", which claims the benefit of French Patent Application No. 10 54914, filed Jun. 21, 2010, the contents of which are incorporated herein by reference in their entirety.

TECHNICAL FIELD

The present invention relates to the monitoring of nuclear material. In this context the expression "nuclear material" means material containing uranium, plutonium or thorium in significant concentrations.

These nuclear materials are handled in a large number of laboratories or plants in the nuclear fuel cycle. Industrial practices are governed by safety constraints, in particular to manage the risk of criticality, and to control proliferation of nuclear material, as set out in the document "FUNDAMENTAL SAFETY RULES RELATIVE TO BASIC NUCLEAR INSTALLATIONS OTHER THAN NUCLEAR REACTORS RFS No 1.3.C OF 18 Oct. 1984".

STATE OF THE PRIOR ART

Operation of industrial or research installations containing nuclear material, and more particularly fissionable nuclear material, i.e. such material capable of nuclear fission, is organised into work stations. A work station is a part of the installation with a demarcated outline, and within which there is a limited mass of nuclear material. In the present invention the work station is a glove box. Management of the mass of nuclear material contained in a work station is one of the methods of controlling the risk of criticality. This method of control is implemented using mass budgets produced, by means of weighing operations, at the entrance and exit of the work station. To prevent excessive accumulation of nuclear material, regular examinations of the work station, and if necessary cleaning operations, are undertaken. This control method is simple to implement and relatively reliable. This control method is generally completed by passive, non-destructive nuclear measurements, such as gamma spectrometry measurements or neutron or gamma metering. Non-industrial, mobile systems are used, requiring installation inside the glove box, and leading to decontamination of the systems at the end of the operation.

However, these analysis techniques are complex to implement, notably since there is no standard positioning system, each measurement requires specific analysis, and interpretation of the measurements requires complex subsequent processing, which does not enable the benefits to be drawn from the results of real-time measurements.

DESCRIPTION OF THE INVENTION

The aim of the present invention is, indeed, to propose a mechanical device for support and attachment of at least one probe for detecting ionising radiation within a glove box so as to be able, easily and simply, and in situ, to monitor nuclear material which produces this ionising radiation, in the glove box. One aim of the invention is to be able to undertake real-time monitoring of the nuclear material.

Another aim of the invention is to be able to place one or more detection probes in the glove box at predetermined locations.

Yet another aim of the invention is to be able to make several measurements with different observation fields.

To accomplish this, the present invention proposes a mechanical device to support and attach at least one ionising radiation detection probe which incorporates, firstly, a collimator-holder and, secondly, a device for attachment to the glove port of a glove box.

More specifically, the present invention is a mechanical device for supporting and attaching at least one ionising radiation detection probe which includes, for each ionising radiation detection probe, a probe-holder ending in a collimator-holder able to support a collimator intended to delimit a field of observation of the detection probe, and also an attachment device intended to be attached to the glove port of a glove box, where the probe-holder, or each probe-holder, cooperates with the said attachment device.

In order to be able to change the collimator easily, so as to give the probe an adjustable field of observation, in addition, means of attaching a collimator to the collimator-holder of the cylinder-cylinder fitting type, and at least one ball plunger, intended to be stopped by a notch held, either by the collimator-holder, or by the collimator, in order to stop the collimator both rotating and sliding relative to the collimator-holder, where the collimator is thus interchangeable.

In order to be able to position the ionising radiation detection probe precisely in the glove box, it is preferable for the collimator-holder to be fitted with locking means to lock the ionising radiation detection probe in position such that it can neither slide nor rotate relative to the collimator-holder.

The attachment device may include a central portion, through which the probe-holder passes, where the edge of this central portion is edged with a flange fitted with attachment means intended to cooperate with combined attachment means held by the glove port of the glove box, where these attachment means are of the bayonet or claw type. By this means it is very easy to install the mechanical device which supports and attaches the ionising detection probe in the glove box.

In order to be able to adjust the depth at which the ionising radiation detection probe is set in the glove box, and the angular alignment of its observation field, the attachment device may be fitted with locking means to lock the probe-holder such that it can neither slide nor rotate relative to the attachment device.

Again, with the aim of controlling the angular alignment of the observation field of the ionising radiation detection probe, the attachment device may include locking means to lock the central portion such that it cannot rotate relative to the flange.

In order for the settings of the angular position of the collimator relative to the probe-holder, and of the probe-holder relative to the attachment device, to be very precise, the collimator-holder and/or the attachment device may be fitted with a bubble level.

The present invention also relates to a nuclear material monitoring device placed in a glove box. It includes a mechanical support and attachment device characterised in this manner, and at least one ionising radiation detection probe placed in the probe-holder, where this probe has a detector sensitive to the ionising radiation emitted from the collimator-holder, and a system for processing and displaying a signal transmitted by the ionising radiation detection probe. The detector is housed in a collimator, when the collimator is attached to the collimator-holder.

The detector may advantageously be made of CdTe or CdZnTe, since these materials are sensitive to ionising radiation.

The probe is preferably a probe of X and/or gamma spectrometry, where X spectrometry concerns the weaker energy levels, more specifically those of less than 120 keV.

The present invention also relates to a glove box fitted with a device for monitoring nuclear material characterised in this manner.

The present invention also relates to a device for monitoring nuclear material characterised in this manner, to identify one or more radioelements present in the monitored nuclear material.

The present invention also relates to the use of a device for monitoring nuclear material characterised in this manner, to determine the activity of the monitored nuclear material.

The present invention also relates to the use of a device for monitoring nuclear material characterised in this manner, to estimate the changes in the retention or decontamination factor of the monitored nuclear material.

BRIEF DESCRIPTION OF THE ILLUSTRATIONS

The present invention will be better understood on reading the description of examples of embodiment given, purely as an indication and in no sense restrictively, making reference to the appended illustrations in which:

FIG. 2A shows the collimator-holder of an example of a mechanical device for supporting and attaching an ionising radiation detection probe according to the invention, where the collimator-holder deliberately has no collimator;

FIGS. 2B, 2C show an example of a collimator-holder and its interchangeable collimator of a mechanical device for supporting and attaching at least one ionising radiation detection probe according to the invention;

FIG. 3 shows a glove box, one glove port of which is fitted with a nuclear material monitoring device according to the invention, with two ionising radiation detection probes, each of which is associated with a collimator;

Figure 5:
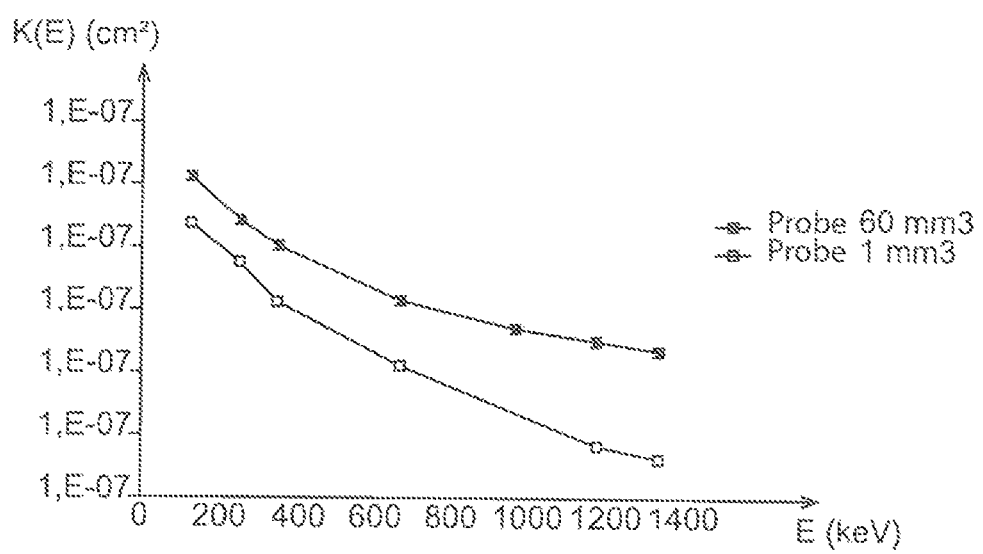

FIGS. 4A1, 4A2, 4B to 4D are various views showing details of the coupling between the glove port of the glove box and the device for attaching the mechanical support and attachment device, where the attachment device is of the claw type;

FIG. 5 is a graph illustrating the intrinsic efficiency as a function of energy of two ionising radiation detection probes, the volume of which is 60 mm$^3$ or 1 mm$^3$.

Identical, similar or equivalent portions of the various figures described below have the same numerical references, to make it easier to move from one figure to another.

The various parts represented in the figures are not necessarily represented at a uniform scale, in order to make the figures more readable.

In these figures, well-known structures are not represented in detail, in order not to overburden the description unnecessarily.

DETAILED ACCOUNT OF PARTICULAR EMBODIMENTS

Figure 1A:
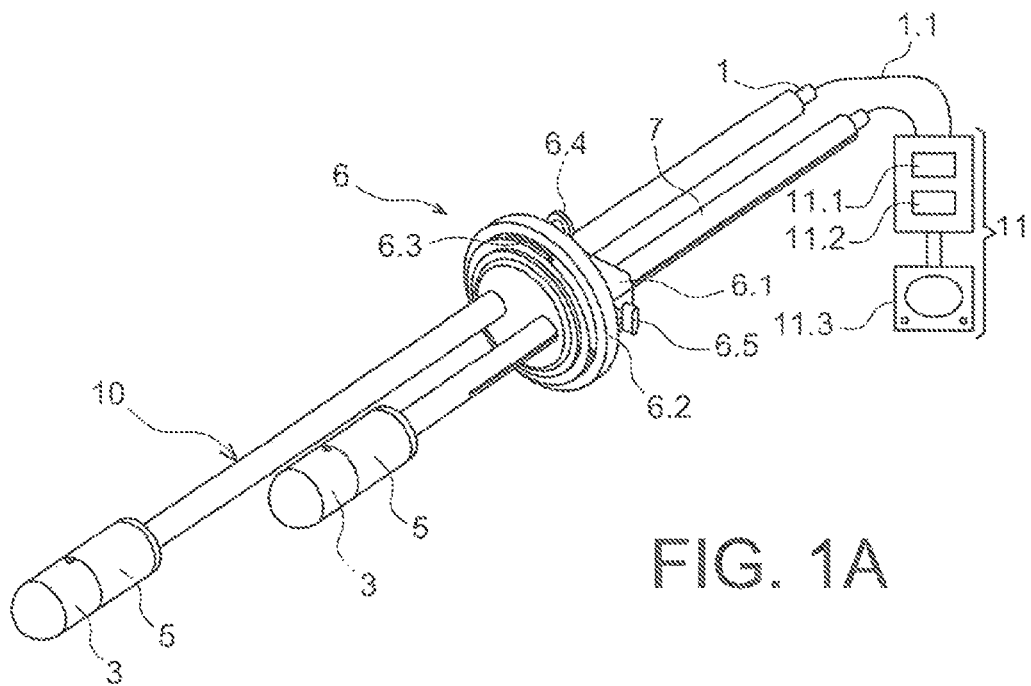
FIGS. 1A, 1B show, in three dimensions, an example of a nuclear material monitoring device with two ionising radiation detection probes forming the object of the invention, using a mechanical device for supporting and attaching the probes the attachment device of which has a bayonet fitting.
Figure 1B:
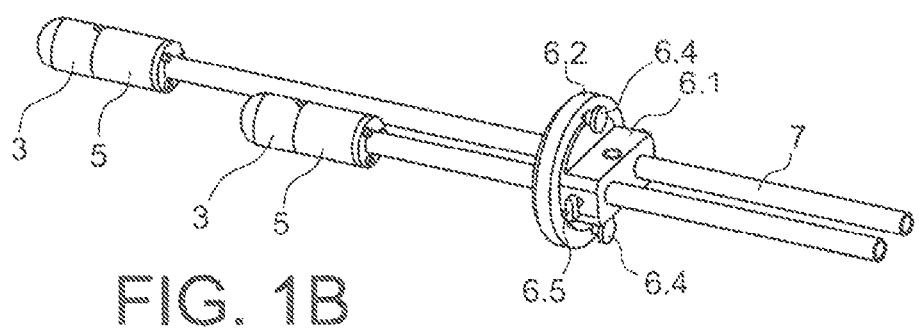

Reference will be made to FIGS. 1A, 1B which show, in three dimensions, two views of a nuclear material monitoring device forming the object of the invention. The nuclear material monitoring device forming the object of the invention is intended to monitor nuclear material placed in a glove box 9. Glove box 9 can be seen only in FIG. 3.

A glove box 9 is a sealed enclosure fitted with at least one pair of apertures 9.1 (of the glove port type), where each of apertures 9.1 is fitted, in a sealed manner, with handling gloves 9.2, enabling operators to intervene in the glove box without risk of contamination. The gloves can be replaced by sleeves allowing equipment or waste to be introduced or removed. In this case the sleeves are attached in sealed fashion to the apertures. FIG. 3 shows only gloves, but it may be imagined that the sleeves would be like gloves with the fingers cut off The nuclear material monitoring device includes, firstly, at least one ionising radiation detection probe 1 and, secondly, a mechanical device 10 to support and attach ionising radiation detection probe 1 in aperture 9.1 of glove box 9. Ionising radiation detection probe 1 is, naturally, connected to a system 11 to process and display a signal transmitted by ionising radiation detection probe 1. Probe 1 for detecting ionising radiation includes a detector 2 which is sensitive to the ionising radiation. In FIGS. 1A, 1B detection probe 1 is only partially visible.

An X and/or gamma spectrometry probe will preferably be used. X spectrometry concerns weaker energy levels than gamma spectrometry, and more particularly levels lower than 120 keV. In the remainder of the description, when the expression "detection probe" is used, this means that this may be any type of ionising radiation detection probe.

An X and/or gamma spectrometry probe 1 enables the spectrum to be known, i.e. the energy distribution of the X and/or gamma radiation emitted by the nuclear material. The spectrum obtained reflects the different elementary interactions of the X and/or gamma radiation in detector 2 fitted to X and/or gamma spectrometry probe 1.

Reference will also be made to FIGS. 2A, 2B, 2C. This ionising radiation detection probe 1 is elongated in shape, extending along an axis xx'. Detector 2, which is sensitive to the ionising radiation originating from the nuclear material, is placed at one end of the probe. This detector 2 transforms the received ionising radiation into an electrical signal. Electrical conductors 1.1, intended to convey the electrical signals in order that they can be processed by processing and display system 11, are accessible at the other end of probe 1.

This detector 2 may be made for example from semiconductor materials such as CdTe or CdZnTe, since these materials are sensitive to X and gamma radiation. This detector 2 may take the form of a rotationally symmetrical cylinder.

This detection probe 1 is preferably collimated. Collimator 3 is intended to limit the portion of space seen by detector 2, i.e. its field of observation. Collimator 3 is characterised by the value of the solid angle delimiting the field of observation of detector 2 of detection probe 1. The volume of detector 2 can vary; however, the same collimator can be used. This volume may for example be between 1 mm$^3$ and 1500 mm$^3$.

Detection probe 1 is intended to be used with mechanical support and attachment device 10 in a glove box which is also an object of the invention. Mechanical support and attachment device 10 of detection probe 1, which is an object of the invention, includes a probe-holder 7 ending in a collimator-holder 5 and an attachment device 6 with a glove port 9.1 of a glove box 9.

Detection probe 1 can be detached from probe-holder 7. To reveal radioactive sources of very different levels a range of detection probes 1 must be available, the detectors 2 of which have different volumes.

Collimator-holder 5 is intended to hold collimator 3. It can be seen in FIG. 2A that detection probe 1, placed in probe-holder 7, can operate without the collimator being present, in an open field. In this configuration collimator-holder 5 holds no collimator 3. Detector 2 of detection probe 1 emerges from collimator-holder 5.

Probe-holder 7 is preferentially a tubular part manufactured around a main axis. Detection probe 1 is intended to be inserted in probe-holder 7. Probe-holder 7 may be made of stainless steel. It has a first open end which must be attached to collimator-holder 5 and a second end by which electrical conductors 1.1 from detection probe 1 can be made accessible in order to be connected electrically to processing and display system 11.

Collimator-holder 5 is a tubular part. It is manufactured around a main axis and is thicker than that of probe-holder 7. Both its ends are open. It is intended to be slipped around probe 1, like probe-holder 7. It is intended to be attached, by one end, to one end of probe-holder 7, and by its other end to a collimator 3. It extends probe-holder 7. Collimator-holder 5 can be made of stainless steel, as can probe-holder 7. It must have stronger mechanical properties than those of collimator 3.

Collimator 3 has a shielding function. It may be made of copper or of a copper alloy, since the copper has a better attenuation factor than steels. Collimator 3 includes an aperture through which the ionising radiation can reach detector 2, when the latter is placed in collimator 3. The remainder of the collimator, i.e. its body, surrounds the detector and has a shielding function against the ionising radiation.

As shown by FIG. 2B, collimator 3 is advantageously made to be detachable, i.e. it can easily be detached from collimator-holder 5. For a given detection probe 1, there can then be several collimators 3, having apertures of different values, and therefore solid angles of different values. It is also possible for there to be no collimators, leaving collimator-holder 5 free. The use of interchangeable collimators 3, enabling variable solid angles to be used, is very useful to adapt the nuclear material monitoring device to the dimensions of the glove box, i.e., firstly, the height between the counter top of the glove box and the axis passing through the centre of the glove port, and secondly the depth of the counter top measured along this axis.

FIG. 2A shows collimator-holder 5 and detection probe 1, which passes through it, revealing detector 2, with the collimator absent. FIG. 2B shows probe 1, collimator-holder 5, a collimator 3 installed in detachable fashion in collimator-holder 5, and a series of other collimators 3 with different solid angles, intended to be installed in collimator-holder 5. FIG. 2C shows, as a lengthways section along axis XX', the different elements of FIG. 2B.

Collimator 3 is a blind tubular part. It is manufactured around a main axis. It is closed at one of its ends; its other end must be attached to collimator-holder 5. The closed end may have the shape of a spherical, flat or other cap. The spherical cap is advantageous to homogenise the thickness of material around detector 2 in spatial terms.

Collimator 3 is intended to house detector 2 of detection probe 1. The volume of the recess inside the collimator is chosen such that it is able to house detectors of different volumes. It includes, laterally, a through hole 3.1, which is preferably cone-shaped, so as to delimit the field of observation of detector 2. The solid angle of the cone is equal to that of collimator 3.

Through hole 3.1 is manufactured around an axis which is perpendicular to that of the main axis of collimator 3. These axes can be seen in FIG. 2C. In FIGS. 2B and 2C, five different collimators 3 have been represented, having solid angles respectively of 10°, 30°, 50°, 70° and 90° degrees. The range of angles covered will therefore be between 10° to 90°, with an interval of 20°. Other values are of course conceivable.

In FIGS. 1A, 1B, detection probe 1, collimator-holder 5, collimator 3 and probe-holder 7 are fitted one inside the other in coaxial fashion.

Collimator 3 and collimator-holder 5 are attached to one another by fasteners 8. These fasteners 8 include, firstly, a cylinder-cylinder fitting, and secondly immobilisation means. Collimator 3 and collimator-holder 5 are installed relative to one another using the cylinder-cylinder fitting. To accomplish this, collimator 3 is fitted with a female cylindrical portion 3.1 which must penetrate into a male cylindrical portion 5.1 held by collimator-holder 5. It could, of course, be envisaged for collimator-holder 5 to be fitted with the female cylindrical portion, and for collimator 3 to be fitted with the male cylindrical portion. This installation enables the collimator to be stopped when it comes up against the collimator-holder.

When fitted into one another, collimator-holder 5 and collimator 3 are prevented from sliding or rotating by immobilisation means 8.1, such as at least one ball plunger intended to pass through a radial through hole 3.2 of female cylindrical portion 3.1, and to come to a stop against a notch 5.2 in male cylindrical portion 5.1. In the figures two ball plungers 8.1 have been represented diametrically opposite one another, which enables the reliability of the rotational locking between collimator 3 and collimator-holder 5 to be improved. In male cylindrical portion 5.1 of collimator-holder 5 a series of regularly distributed notches 5.2 have been represented, which enables the angular position of through hole 3.1 of collimator 3 to be adjusted relative to collimator-holder 5. In FIG. 2A 12 notches 5.2 have been represented. This number is not restrictive. The adjustment of the angular position of the aperture of collimator 3 relative to collimator-holder 5 enables parasitic gamma radioactive sources to be avoided, by excluding them from the solid angle, and therefore from the field of observation of the detection probe. When mechanical support device 10 is designed for several detection probes 1, an adjustment of the angular position of the aperture of collimators 3 enables the field of vision of each detection probe 1 to be aligned differently, so as to cover the largest possible area of the counter top of glove box 9, as illustrated in FIG. 3.

In collimator-holder 5 locking means 5.3 are also provided to prevent detection probe 1 from sliding or rotating. They are visible only in FIGS. 2B and 2C.

These locking means 5.3 can comprise a screw, which penetrates radially into a bore of collimator-holder 5, and one end of which comes to a stop against detection probe 1 when locked.

Mechanical support and attachment device 10 also includes an attachment device 6 to be attached to a glove port 9.1 of glove box 9. Glove 9.2 or the sleeve remain in place when the nuclear material monitoring device is slipped into glove port 9.1 of glove box 9. In this context we continue to use the term "glove port" even if it has a sleeve.

Attachment device 6 includes a central portion 6.1 surrounded by a flange 6.2, which must be attached to glove port 9.1 of glove box 9. Reference is made to FIGS. 1A, 1B again, and also to FIG. 3. This glove port 9.1 is edged with a ring 9.5 which can be fitted with lugs 9.3, of which there are generally three. For its part, flange 6.2 is, in these figures, fitted with a bayonet type attachment 6.3, matching lugs 9.3. One or more probe-holders 7 traverse central portion 6.1. There is a single attachment device 6 for several probe-holders 7. Central portion 6.1 is represented in the form of a full disk, having however one or more holes into each of which one of probe-holders 7 is introduced. This central portion 6.1 is similar to a shutter. It plugs glove port 9.1. Perforated central portions would be possible, with the glove providing static sealing. The only role of central portion 6.1 is to support and position probe-holder, or each probe-holder, 7.

Figure 4B:
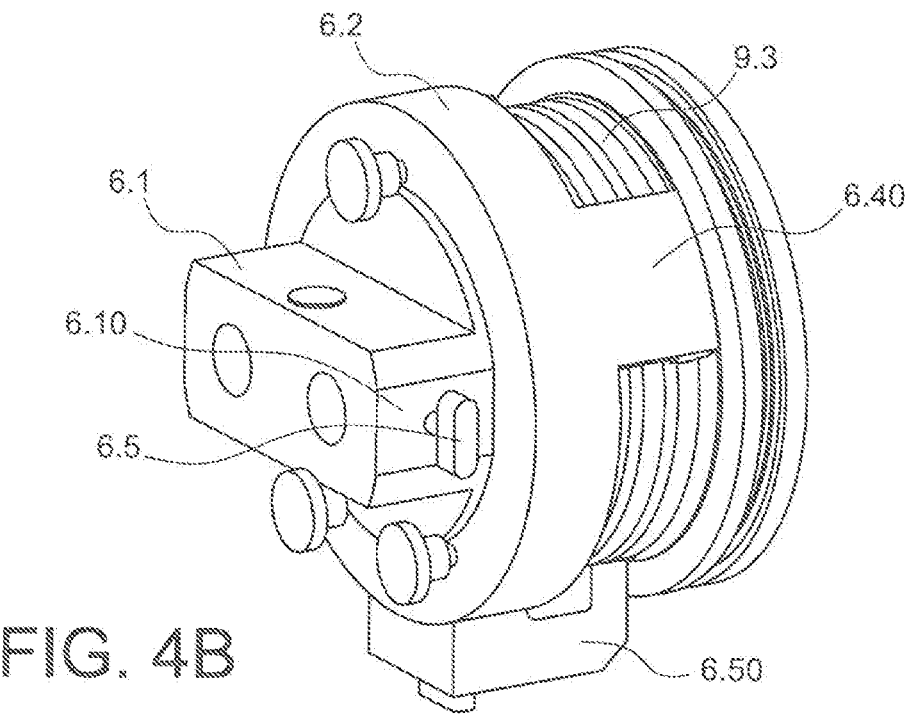
Figure 4C:
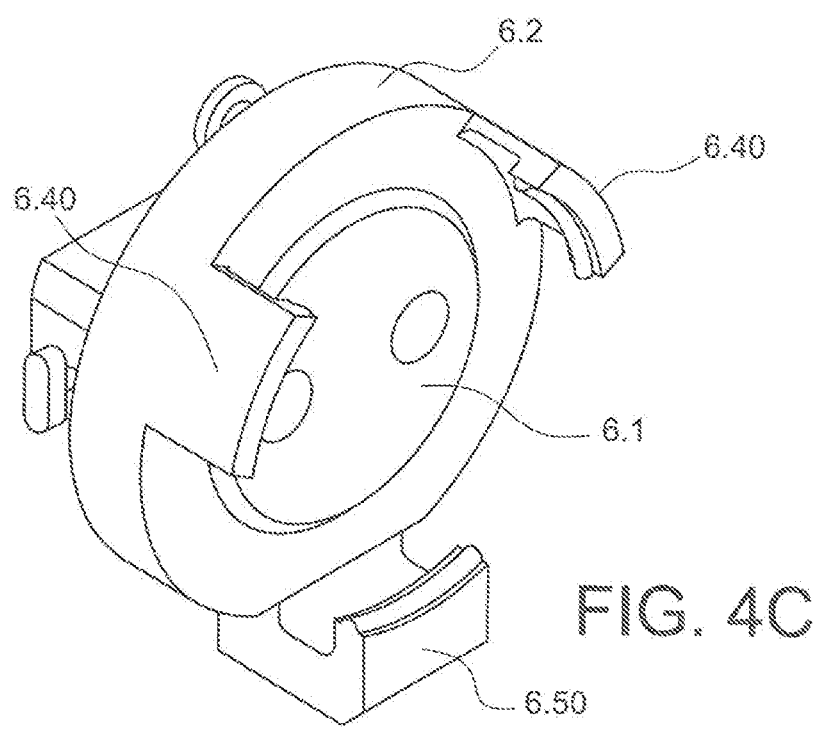
Figure 4D:
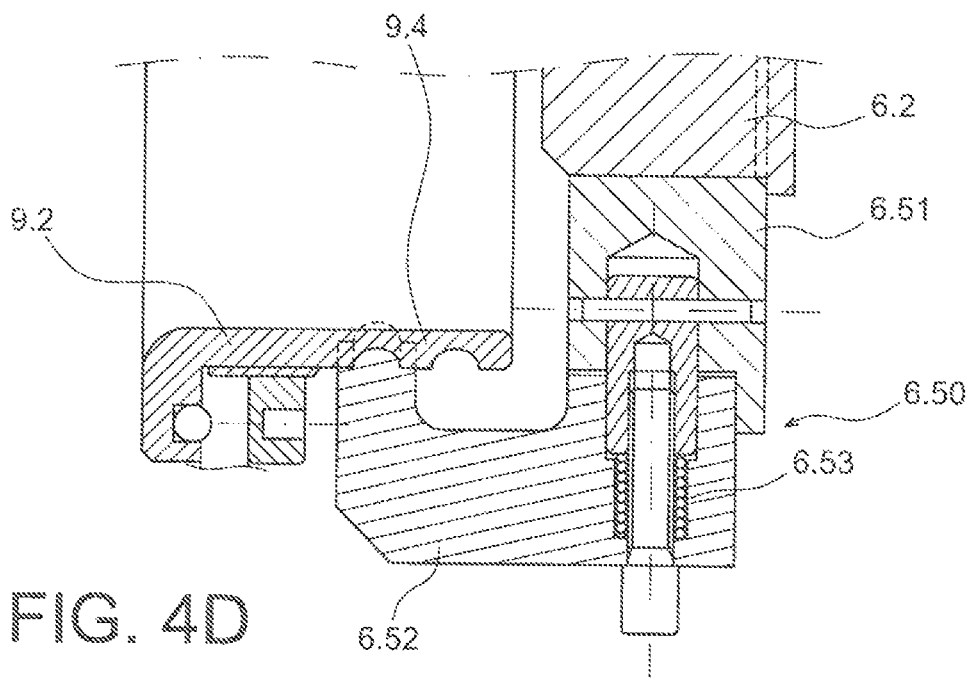

As a variant illustrated in FIGS. 4A1 and 4A2, glove port 9.1 is edged with a ring 9.5 provided externally with one or more grooves 9.41 or one or more beads 9.42. Grooves 9.41 are recessed and beads 9.42 protruding. Flange 6.2 is provided with radial claws 6.40, 6.50 which support the outside of ring 9.2 in at least 9.42. Reference is made to FIGS. 4B, 4C, 4D. Among claws 6.40, 6.50, at least one referenced 6.50 is adjustable, as is illustrated in FIG. 4D; the other claw or claws 6.40 are fixed. Adjustable claw 6.50 is in two portions, one fixed portion 6.51 securely attached to flange 6.2, and one moving portion 6.52 with a curved end, intended to engage in a groove 9.41, in this instance the second one, the one closest to the glove box, in order for the attachment to be optimal. If instead of grooves ring 9.5 has one or more beads 9.42, as in FIG. 4A2, the moving portion 6.52 is supported by one of the beads, for example the second one, the one which is closest to the glove box. Screw clamping means 6.53 are provided to hold moving portion 6.52 against fixed portion 6.51, when the curved end of moving portion 6.52 is in place.

Central portion 6.1 can be rotated relative to flange 6.2, notably when flange 6.2 is attached and prevented from rotating in glove port 9.1 of the glove box. The detector is then positioned in the glove box. Means 6.4 to prevent central portion 6.1 from rotating relative to flange 6.2 are provided. This may be at least one knurled screw 6.4 which can be screwed into flange 6.2, and the head of which, when screwed in, immobilises central portion 6.1 relative to flange 6.2. It is preferable to have several knurled screws distributed around central portion 6.1. The advantage of a knurled screw is that in its head it has a large shoulder giving it a large clamping area.

Two such screws, diametrically opposite one another, have been represented in the figure. The axis of the screw is roughly parallel to axis XX'. Attachment device 6, and more particularly its central portion 6.1, are fitted with a bubble level 6.5 such that it is possible to determine the angular alignment of central portion 6.1, relative to horizontal and/or vertical.

Each probe-holder 7 can slide and rotate relative to attachment device 6 before tightening. It can slide in central portion 6.1 of attachment device 6. Locking means 6.5 to prevent sliding and rotation of each of probe-holders 7 relative to attachment device 6 are provided, which enables the depth of the position of the detector in the glove box relative to the glove port to be adjusted, after attachment device 6 is securely attached to the glove box. These locking means 6.5 can be implemented, for example, for each probe-holder 7, by a thumbscrew, which can be screwed in and unscrewed easily by hand. This thumbscrew is screwed into a protrusion 6.10 on central portion 6.1 of attachment device 6. Its end engages in a groove on probe-holder 7, which prevents rotation or sliding. The groove cannot be seen in the figures. This type of means to prevent rotation or sliding is conventional in mechanics.

Each detection probe 1 is, naturally, intended to be powered with high and low voltages, preferably independently; this power source is not represented in order not to overburden the figures. Each detection probe 1 is intended to be connected to a system 11 for processing and displaying a signal transmitted by the probe.

Detectors made of CdZnTe or CdTe are chosen in preference, since they have greater efficiency at low energy than at high energy, as illustrated in FIG. 5, whilst having satisfactory resolution. The resolution is equal, in a spectrum, to the breadth of a peak at half-height; it must be sufficient to be able to be read. For example, in the case of americium 241, this breadth is less than 1 keV. In addition, the morphology of these detectors is sufficiently compact which means, when they are housed in a collimator, that they can be introduced, as a single unit or as several units, into a standard glove port of a glove box.

FIG. 5 was obtained with detectors made of CdZnTe, of volumes 1 mm$^3$ and 60 mm$^3$. It can be seen that the scale of the abscissae covers the range 0 to 1400 keV. It is also recalled that actinides (radioelements the mass number of which is greater than that of actinium, namely 227) have energy gamma rays the peaks of which are between 0 and 300 keV. For example, the two characteristic lines of plutonium or of its descendants have an energy level of 59.54 keV for americium 241 and 208 keV for uranium 237.

The intrinsic efficiency K(E) in cm$^2$ at energy E of a given detector is determined, experimentally, by means of localised measurement standard sources, the activity which is known, placed at a given distance from the detector. For each significant peak of the spectrum obtained with a measurement standard source, the metering rate is calculated, and it is related to the measurement standard fluence rate at the centre of the detector. The intrinsic efficiency of the detector satisfies the formula $K(E)=S(E)/Tc \times \Phi(E)$, where S(E) is the net area of the energy peak at energy level E, Tc is the acquisition time of the spectrum expressed in seconds, and $\Phi(E)$ is the fluence flow rate (gamma/cm$^2$/s) at the centre of the detector.

The spectrum is processed in a conventional fashion.

It enables an operator to know how the quantity of nuclear material in the glove box has changed, in two ways. For each line present in the spectrum the corresponding energy at the top of the peak and the net area of the peak are provided.

One of the ways is to obtain the FD retention or decontamination factor, and the other is a direct reading of the spectrum leading to a determination of the activity of the nuclear material contained in the solid angle of the collimator. This angle can vary in size and in position so as to cover the entire glove box.

To estimate retention or decontamination factor FD for a given radioelement, the net area of the peak at significant energy level Ei of this radioelement is determined at two given instants, t0 and t1, where t1 is later than t0. It is presumed that the mass of nuclear material has changed between these two instants. These areas corrected for time (metering rates) are called $N_{0Ei}$ and $N_{1Ei}$. Retention or decontamination factor FD for energy Ei between instant t0 and instant t1 is the ratio $N_{0Ei}/N_{1Ei}$.

One or more radioelements present in the monitored nuclear material can by this means be identified, and this nuclear material is present in the glove box.

The invention claimed is:

1. A mechanical device for supporting and attaching at least one probe for detecting ionizing radiation characterized in that it includes, for each detection probe, a probe-holder ending in a collimator-holder able to support a collimator intended to delimit a field of observation of the detection probe, an attachment device intended to be attached to a glove port of a glove box, where the probe-holder, or each probe-holder, cooperates with the said attachment device and also a collimator and attachment means for attaching the collimator to the collimator-holder of the cylinder-cylinder fitting type, with at least one ball plunger intended to come to a stop against a notch held either by the collimator-holder, or by the collimator to prevent the collimator from rotating or sliding relative to the collimator-holder, where the collimator can be detached so as to be able to adjust a field of observation of the detection probe.

2. A mechanical device according to claim 1, in which the collimator-holder is provided with locking means for preventing the detection probe from sliding or rotating relative to the collimator-holder.

3. A mechanical device according to claim 1, in which the attachment device includes a central portion, through which the probe-holder passes, where this central portion is edged with a flange fitted with attachment means intended to cooperate with combined attachment means held by the glove port of the glove box, where these attachment means are of the bayonet or claw type.

4. A mechanical device according to claim 1, in which the attachment device includes locking means to prevent the probe-holder from sliding or rotating.

5. A mechanical device according to claim 1, in which the attachment device includes locking means to prevent the central portion from sliding or rotating relative to the flange.

6. A mechanical device according to claim 1, in which the attachment device is fitted with a bubble level.

7. A nuclear material monitoring device placed in a glove box, characterized in that it includes a mechanical support and attachment device according to claim 1, at least one ionizing radiation detection probe placed in the probe-holder, where this ionizing radiation detection probe has a detector which is sensitive to the ionizing radiation which is emitted from the collimator-holder, and a system for processing and displaying a signal delivered by the ionizing radiation detection probe.

8. A nuclear material monitoring device according to claim 7, in which the detector is housed in the collimator, when the collimator is attached to the collimator-holder.

9. A nuclear material monitoring device according to claim 7, in which the ionizing radiation detection probe is an X and/or gamma spectrometry probe.

10. A nuclear material monitoring device according to claim 7, in which the detector is made of CdTe or CdZnTn.

11. A glove box characterized in that it is fitted with a nuclear material monitoring device according to claim 7.

* * * * *